United States Patent
Leconte

(10) Patent No.: US 8,201,418 B2
(45) Date of Patent: Jun. 19, 2012

(54) METHOD FOR GLASS PREPARATION

(75) Inventor: Jean-Gerard Leconte, Courbevoie (FR)

(73) Assignees: Saint-Gobain Isover, Courbevoie (FR); Saint-Gobain Glass France, Courbevoie (FR)

( * ) Notice: Subject to any disclaimer, the term of this patent is extended or adjusted under 35 U.S.C. 154(b) by 645 days.

(21) Appl. No.: 11/995,596

(22) PCT Filed: Jul. 12, 2006

(86) PCT No.: PCT/FR2006/050709
§ 371 (c)(1),
(2), (4) Date: May 28, 2008

(87) PCT Pub. No.: WO2007/007012
PCT Pub. Date: Jan. 18, 2007

(65) Prior Publication Data
US 2008/0276648 A1  Nov. 13, 2008

(30) Foreign Application Priority Data
Jul. 13, 2005  (FR) ..................... 05 52202

(51) Int. Cl.
*C03B 5/04* (2006.01)
*C03B 5/235* (2006.01)
*C03B 5/435* (2006.01)

(52) U.S. Cl. ............ 65/136.3; 65/134.4; 65/136.2
(58) Field of Classification Search ......... 65/134.4, 65/135.9–136.3
See application file for complete search history.

(56) References Cited

U.S. PATENT DOCUMENTS

| | | | |
|---|---|---|---|
| 3,307,929 A * | 3/1967 | Trap | 65/32.5 |
| 3,337,324 A * | 8/1967 | Cable, Jr. et al. | 65/136.3 |
| 3,498,775 A * | 3/1970 | Simmons | 65/33.8 |
| 3,856,496 A * | 12/1974 | Nesbitt et al. | 65/29.13 |
| 4,473,388 A | 9/1984 | Lauwers | |
| 4,599,100 A * | 7/1986 | Demarest, Jr. | 65/134.4 |
| 6,237,369 B1 * | 5/2001 | LeBlanc et al. | 65/134.1 |
| 6,422,041 B1 * | 7/2002 | Simpson et al. | 65/134.4 |
| 6,519,973 B1 * | 2/2003 | Hoke, Jr. et al. | 65/134.4 |
| 6,705,117 B2 * | 3/2004 | Simpson et al. | 65/134.4 |

FOREIGN PATENT DOCUMENTS

| | | |
|---|---|---|
| FR | 1 395 208 | 4/1964 |
| FR | 2 325 612 | 4/1977 |
| FR | 2 787 784 | 6/2000 |
| JP | 6 56434 | 3/1994 |
| WO | 02 092521 | 11/2002 |

* cited by examiner

*Primary Examiner* — Matthew Daniels
*Assistant Examiner* — Cynthia Szewczyk
(74) *Attorney, Agent, or Firm* — Oblon, Spivak, McClelland, Maier & Neustadt, L.L.P.

(57) ABSTRACT

The invention concerns a method for preparing glass from raw materials in powder form in a furnace comprising three side walls, a roof, an upstream pinion and at least one air injector associated with a gas or liquid fuel injector, at least one of said injectors being arranged in said side walls, in said roof or in said upstream pinion. Said method includes the following steps: injecting air and gas or liquid fuel through said injectors, at least one flame being generated immediately proximate the zone where said raw materials in powder form cover the glass solution.

15 Claims, 2 Drawing Sheets

METHOD FOR GLASS PREPARATION

CROSS-REFERENCE TO RELATED APPLICATIONS

This application is a 371 of PCT/FR06/50709 filed Jul. 12, 2006 and claims the benefit of FR 0552202 filed Jul. 13, 2005.

The present invention relates to a process for glass preparation. It more particularly relates to a process in which at least one flame comes into contact with the blanket.

The preparation of glass requires high temperatures, often of around 1400° C. to 1700° C. depending on the type of glass. Large amounts of energy are thus necessary, not only for melting the batch materials, but also for accelerating the chemical reactions between said batch materials, especially the reactions for dissolving silica (main component of most industrial glass, and among which its melting point is the highest). A high temperature is also necessary for removing any gaseous inclusions from the bath of molten glass, this step being known as "refining".

These gaseous inclusions have several origins. They mainly come from air trapped between the grains of pulverulent materials and from degassing due to certain chemical reactions occurring during the step of melting the glass. Thus, the carbonate-based batch materials (such as, for example, sodium carbonate, limestone or dolomite) release large amounts of carbon dioxide in gas form. The gaseous inclusions may also be due to desolubilization reactions of certain gases under certain conditions, or to chemical or electrochemical reactions between the molten glass and certain materials present in the furnaces (refractory ceramics and/or metals). The gaseous inclusions are trapped within the mass of molten glass, from which they can escape at a rate proportional to the square of their diameter. Thus, small bubbles (sometimes known as "seeds") can escape only at very low rates. The rate of rise of bubbles may furthermore be slowed down by the viscosity of the glass and by convective movements that may entrain the bubbles toward the floor of the furnace. Since the viscosity decreases when the temperature increases, a high temperature is thus necessary to obtain a glass free from gaseous inclusions.

In the furnaces for glass production, the energy is generally supplied to the glass by burners and/or by electrodes submerged in the glass.

In most industrial furnaces, in particular for the production of flat glass, bottles or fibers, burners are placed in the breast walls or in the end wall of the furnaces so as to develop a flame parallel to the surface of the glass bath. This especially refers to "overhead" burners, as the flame does not come into contact with the surface of the glass bath. This flame heats the glass bath by radiation, partly directly, but also indirectly due to the presence of a crown positioned above the burners, said crown reflecting the thermal radiation.

According to a geometry known as "cross-fired", frequently used in melting furnaces for flat glass, these overhead burners are positioned on the sidewalls or breast walls, and the flames spread out across the flow direction of the molten glass. Charging of the batch materials is then generally carried out via the end wall of the furnace.

According to another geometry, more frequently used in the packaging field (bottles, pots, flasks, etc.) and known as "horseshoe-fired", a large flame spreads out from the end wall of the furnace, in the flow direction of the molten glass.

Two large groups of burners are employed depending on the nature of the oxidizer used. In the case where air is used as an oxidizer, techniques for heat recuperation make it possible to limit the energy losses due to heating a large amount of nonreactive and therefore unnecessary nitrogen. According to the most common techniques, some of the heat generated by the combustion reaction is stored in recuperators or regenerators formed from multilayers of refractory materials, this heat being then reused to preheat the air used for the combustion.

Oxygen may also be used as an oxidizer, which does not require the construction of such recuperators.

When the glass is difficult to melt, or when an increase in the output is required, "boosting" is commonly used. In the case of glass that absorbs infrared radiation for example, electrodes may be used on the floor of the furnace in order to supply a surplus of energy and thus to accelerate melting. Absorption of the infrared radiation by the glass bath indeed prevents said radiation from penetrating the layers closest to the floor.

Other melting or boosting techniques have been described, which consist in generating an oxygen burner flame in direct contact with the glass bath or with the blanket. The "blanket" is known as the zone where the bath of molten glass is covered by the pulverulent batch materials that have not yet melted. This zone is located close to batch charges used to introduce batch materials into the furnace. The pulverulent batch materials also comprise "cullet", that is to say ground recycled glass.

Application WO 82/04246 thus describes a process in which the oxygen burner flames are directed at the glass bath, at the places where it is not covered by the batch materials. Application EP 546 238 describes a process in which the flame generated by the oxygen burner comes into contact with the molten glass at the interface between the exposed glass bath and the blanket. In application EP 1 077 901 on the other hand, the oxygen flame is formed in close proximity to the blanket, said oxygen flame is derived from a burner located in the crown and is formed perpendicular to the surface of the glass bath. The oxygen flame, whose adiabatic temperature is very high, thus makes it possible to transfer energy to the glass bath or to the blanket both by radiation and by convection, thus increasing the output, that is to say the amount of glass produced per unit of time.

These processes are however not free from drawbacks, especially in terms of the quality of the glass.

This type of process cannot be used in the case of glass that is rich in volatile components such as alkali metal oxides (sodium, potassium or lithium oxides) and/or boron oxide, as large amounts of fly-off material are produced, which translates into a large decrease in the content of said components. These fly-off materials are harmful to the quality of the glass, to the environment (thus requiring the acquisition of particularly expensive pollution control systems) and also to the stability of the glass composition and therefore to the stability of its physicochemical properties.

Similarly, in glass that is low in alkali metal oxides, refining problems are encountered, due to excessive reboiling.

Finally, the position of the burners in the crown poses problems of embrittlement of the latter.

One object of the invention is to overcome these drawbacks by providing a process that enables melting of the glass to be improved while increasing the output, without prejudicing the refining quality. Another object of the invention is to prevent the embrittlement of the crown of the furnaces.

The subject of the invention is a process for preparing glass from pulverulent batch materials in a furnace comprising sidewalls, a crown, an end wall and at least one air injector combined with at least one gaseous or liquid fuel injector, at least one of said injectors being placed in said sidewalls, in said crown or in said end wall, said process comprising the steps of injecting air and gaseous or liquid fuel through said injectors, the or each flame thus generated only being generated in the immediate vicinity of the zone where said pulverulent batch materials cover the glass bath.

According to the invention, air is therefore used as an oxidizer. The term "air" should be understood to mean air that is not oxygen-enriched, consequently comprising about 20% oxygen per 80% nitrogen.

The inventors have noticed that the flame produced using air as an oxidizer enables a certain number of unexpected advantages to be combined.

This is because it turns out that such a flame makes it possible to limit the fly-off of volatile components, probably due to a lower flame temperature. In addition, an improvement in the refining quality is observed, in particular for glass that is low in alkali metals. This is because this glass is usually refined using sodium sulfate, sulfur trioxide $SO_3$ then being dissolved in the glass bath. Glass that is low in alkali metal oxides however has a low solubility in this component, which generates risks of excessive reboiling. Such a reboiling, which damages the refining quality, is indeed observed when an oxygen flame is used, but does not occur in the case where a flame is used in which air is used as an oxidizer. It would appear that the high water content typical of an oxygen melting atmosphere is the cause of this reboiling.

The process according to the invention also makes it possible to decrease the risks of embrittlement of the crown, in particular, but not uniquely, when the injectors are located at the sidewalls or breast walls. This advantage also results from the decrease in fly-off of volatile materials and in the difference in the combustion atmosphere.

Despite the lower adiabatic flame temperature between the air flame and the oxygen flame, it has, on the other hand, surprisingly appeared that changing the oxidizer is not accompanied by any significant drop in output.

According to one embodiment of the invention, most of the energy is supplied to the glass bath by use of such a process. The invention then uses a furnace specially dedicated to this process, moreover not having overhead burners.

An alternative method is however preferred, in which the injectors are used to supply a surplus of energy (boosting) in a furnace comprising at least one overhead burner, preferably in a furnace comprising at least one overhead burner, of which the oxidizer is air, and at least one heat recuperator or regenerator.

The choice in the placement of the injectors, in the crown or in the sidewalls or in the end wall depends on the configuration of the furnace, in particular when the process consists in supplying boosting energy to an existing furnace.

Placement in the walls (breast walls) or in the end wall makes it possible to limit the risks of embrittlement of the crown and also facilitates the installation in a furnace that is already in operation, the crown temperature being much higher than that of the other constituent parts of the furnace.

In this embodiment, an angle between 40 and 80° is advantageously provided between the flame axis and the horizontal axis. It is also possible to provide breast walls or an end wall of which the upper part is inclined and not vertical.

All types of combinations of injectors may be envisaged within the scope of the present invention.

The injection of air and of gaseous or liquid fuel such as natural gas or fuel oil may thus be carried out via a burner comprising at least one approximately cylindrical inner duct for the fuel and an outer duct for the air that is concentric to the inner duct. When the fuel is injected by means of a single internal duct, it is however impossible to independently control the flow rates and speeds of the gases. It is therefore preferable that the fuel, when it is gaseous, is injected at two different pressures via two concentric internal ducts.

Separate injectors may also be used, the fuel and the air oxidizer being injected from different places in the furnace such as the crown, the end wall or the sidewalls. The two injections, thus separated, are then controlled so that the two jets, the jet of air and the jet of fuel, meet in the immediate vicinity of the blanket, therefore in the zone where the pulverulent batch materials cover the glass bath, generating a flame, location of the combustion, in this precise place. The air may thus be injected by means of an injector located in the furnace crown and the fuel injected by an injector located in the sidewalls of the furnace or vice versa. It is also possible that an air injector is combined with several fuel injectors, or vice versa.

In any case, it is preferable that the flame is only generated in the immediate vicinity of the zone where said pulverulent batch materials cover the glass bath (blanket) which makes it possible to prevent any overheating of the crown or of the sidewalls, while maximizing the heat transfer to the batch materials. The flame is itself advantageously controlled so that it spreads out over the blanket covering most of said blanket. The term "immediate vicinity" should be understood to mean that the flame, directed from the upper part of the furnace toward the blanket, is formed in a zone located just above the blanket; the energy generated by the flame is thus transmitted very efficiently to the batch materials, principally by convection.

It has been observed that an optimum heat transfer to the batch materials is carried out when the specific impulse of the combination of injectors is between 2 and 4 N/MW, especially between 2.6 and 3.2 N/MW. The specific impulse is defined in the meaning of the present invention as the sum of the air and fuel impulses (rate of momentum) relative to the power of the combination of injectors. An optimal heat transfer is then obtained, being characterized by a flame that is formed solely in the immediate vicinity of (just above) the blanket.

The fuel and air flows exiting the injectors are not generally laminar, in the sense that the Reynolds number (Re) is greater than 2000. Despite this, no reactive mixing of the two jets is observed, insofar as the specific impulsion is suitably controlled.

Additional air inlets may advantageously be created so as to implement a staged combustion.

According to one preferred embodiment of the process according to the invention and in order to further improve the heat transfer to the batch materials, the air used as an oxidizer is preheated to a temperature of at least 500° C. before entering into the furnace.

The fuel flow rate is preferably between 50 and 300 $Sm^3/h$, the power of each combination of injectors then being between 0.5 and 3 MW.

The gaseous or liquid fuel and the air may be introduced in stoichiometric amounts. Other conditions, such as substoichiometric, therefore reducing (insufficient air), conditions may nevertheless be preferred in certain cases. This is for example the case when glass having a high redox (greater than 0.3, even greater than 0.5) is desired, the redox being defined by the amount of iron present in the glass in the reduced form (ferrous iron) relative to the total amount of iron.

As indicated above, the process according to the invention has a maximum of advantages for preparing the glass containing volatile materials such as alkali metal oxides or boron oxide. The process according to the invention is therefore preferably used for producing glass whose chemical composition comprises more than 3%, even 4%, by weight of boron oxide and/or more than 12%, even 15%, of alkali metal oxides.

The process according to the invention is thus advantageously intended to prepare glass for thermal and sound insulation fibers, of which the composition comprises the following constituents within the limits defined below, expressed as weight percentages:

| | |
|---|---|
| $SiO_2$ | 45 to 75; |
| $Al_2O_3$ | 0 to 10; |
| CaO | 0 to 15; |
| MgO | 0 to 15; |
| $Na_2O$ | 12 to 20; |
| $K_2O$ | 0 to 10; |
| $B_2O_3$ | 3 to 10; |
| $Fe_2O_3$ | 0 to 5; and |
| $P_2O_5$ | 0 to 3. |

The process according to the invention is also specially adapted for producing glass that is low in alkali metal oxides, in particular for glass containing less than 2% by weight of alkali metal oxides, even less than 1% or 0.5%.

Among this type of glass is the glass that can be used as substrates for LCDs (Liquid Crystal Displays), glass of which the composition comprises the following constituents within the limits defined below, expressed as weight percentages:

| | |
|---|---|
| $SiO_2$ | 58-76%; |
| $B_2O_3$ | 3-18%, especially 5-16%; |
| $Al_2O_3$ | 4-22%; |
| MgO | 0-8%; |
| CaO | 1-12%; |
| SrO | 0-5%; and |
| BaO | 0-3%. |

This glass thus combines the presence of boron oxide and the low content of alkali metal oxides, which makes the process according to the invention particularly suitable for its preparation.

Another subject of the invention is a process for preparing glass from pulverulent batch materials in a furnace comprising sidewalls, an end wall and at least one burner placed in said sidewalls or in said end wall, said process comprising the steps of injecting an oxidizer and gaseous or liquid fuel through or in combination with said at least one burner, a flame being generated in the immediate vicinity of the zone where said pulverulent batch materials cover the glass bath.

Positioning of the burner, whether it is an oxygen burner or an air burner, in the sidewalls and/or in the end wall thus has the advantage of decreasing the risks of deterioration of the crown.

The invention will be better understood on reading the following exemplary embodiments and figures, illustrating the invention without however limiting it.

FIGS. 1 and 2 schematically represent a longitudinal cross section of a furnace being used to implement the process according to the invention.

Figure 1:
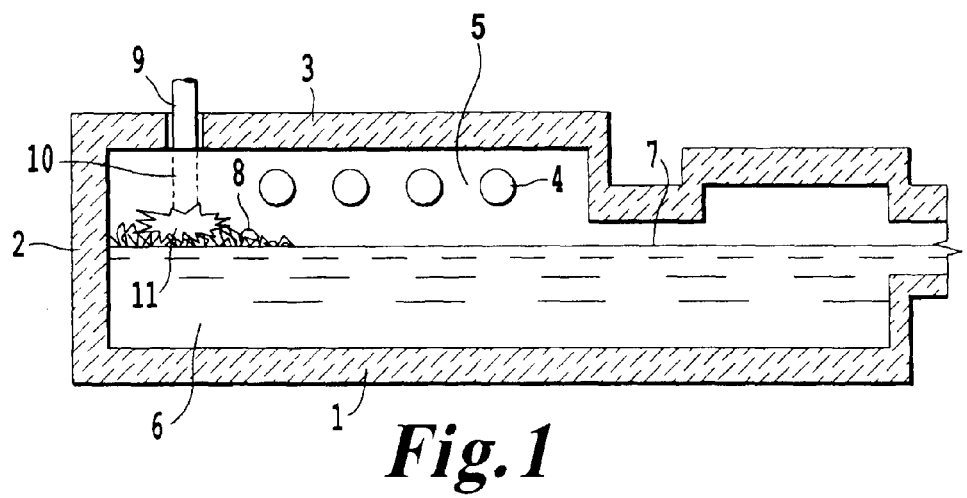
FIG. 1 illustrates an embodiment according to which a burner is placed in the crown, whereas in the embodiment illustrated by FIG. 2, a burner is placed in the end wall.

In both cases, the furnace, built of refractory materials, comprises a floor 1, an end wall 2 and a crown 3. Overhead burners 4 are placed in a configuration known as "cross-fired", therefore on the sidewalls 5 or breast walls. Schematically, four overhead burners 4 operating on air have been shown, four other burners (not shown) being located opposite them on the other sidewall. As a general rule, industrial furnaces of this type comprise 6 to 8 pairs of overhead burners. In a normal operating regime, only the burners from one and the same wall operate simultaneously, the combustion gases emitted reheating the refractory multilayers located in the regenerators of the opposite wall. After a cycle of about 20 minutes, these burners stop functioning and the burners from the opposite wall are started up, the air being used as an oxidizer being preheated as it has circulated around the refractory multilayers of the regenerators that have just been reheated. The flames of these overhead burners 4 develop parallel to the surface 7 of the glass bath 6.

Pulverulent batch materials are introduced via a batch charger (not shown) and form a blanket 8 on the surface of the glass bath 6.

Represented in FIG. 1 is a combination of injectors in the form of a burner 9 located in the crown. This burner 9 comprises two concentric cylinders, the inner cylinder being intended for injecting the fuel, in this case natural gas or methane ($CH_4$), the outer cylinder being itself intended for injecting air.

The two streams flow in a non-laminar way into a zone 10 approximately perpendicular to the surface 7 of the glass bath 6, then react in contact with the blanket 8 to form a flame 11, that is the location of the combustion reaction between air and natural gas.

Figure 2:
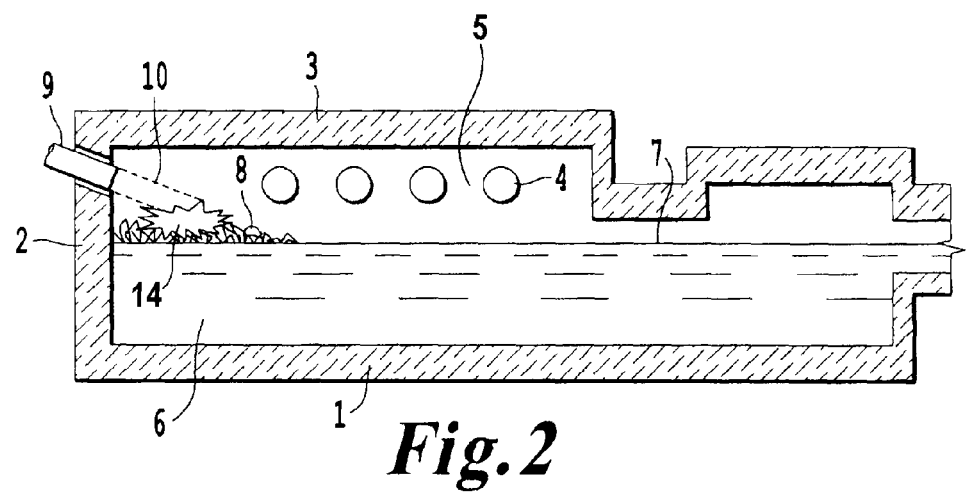

In FIG. 2, a burner is positioned in the end wall 2, forming an angle of around 45° with the horizontal axis. A flame 14 is generated in the immediate vicinity of the blanket 8.

The flame 11 makes it possible to accelerate the melting procedure via various phenomena. The greater efficiency of the heat transfer toward the blanket obviously contributes to this increase in the melting kinetics. The impulse of the flame 11 modifies, in addition, the convection currents in the glass bath 6 and forces the pulverulent batch materials to penetrate into the glass bath 6, which increases their melting and dissolution rate. In the absence of burners creating a combustion in the vicinity of the blanket, the latter could float for longer without reacting and could cover, in addition, a larger area of the glass bath 6, decreasing the heat transfer from the overhead burners toward the glass bath.

In a variant that is not shown, a burner is positioned in the breast wall 5, especially in the upper part, forming a suitable angle so that the flame 11 is generated in the immediate vicinity of the blanket.

Figure 3:
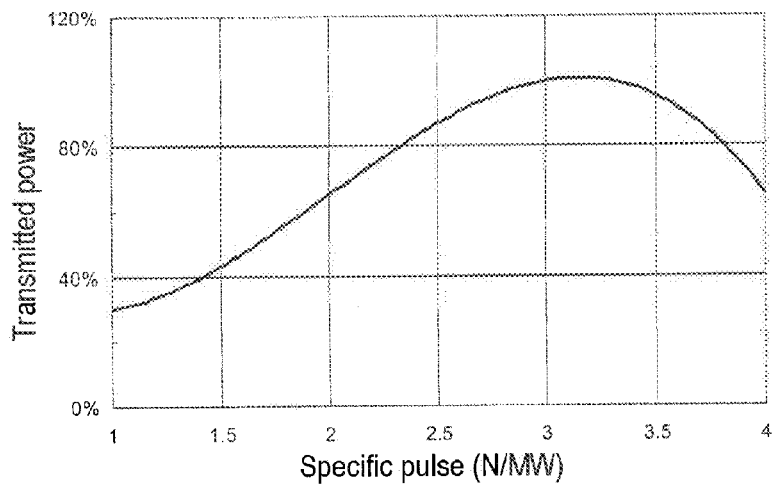
FIG. 3 represents a curve obtained experimentally that describes the change observed between the power transmitted to the batch materials and the specific impulse.

FIG. 3 represents a curve describing the relationship between the power transmitted to the batch materials and the specific impulse.

This relationship was observed following tests carried out on burners placed in the crown of a furnace. During these tests, the specific impulse of the burner was adapted by modifying the injection rates.

The specific impulse of the burner has been represented on the x-axis, the y-axis being associated with the power transmitted to the batch materials (in arbitrary units, the maximum power being associated with a value of 100%).

This curve shows that the specific impulse value of about 3 N/MW is related to the maximum power transmitted to the blanket, and consequently to the case where the flame is only generated in the immediate vicinity of the blanket.

Figure 4:
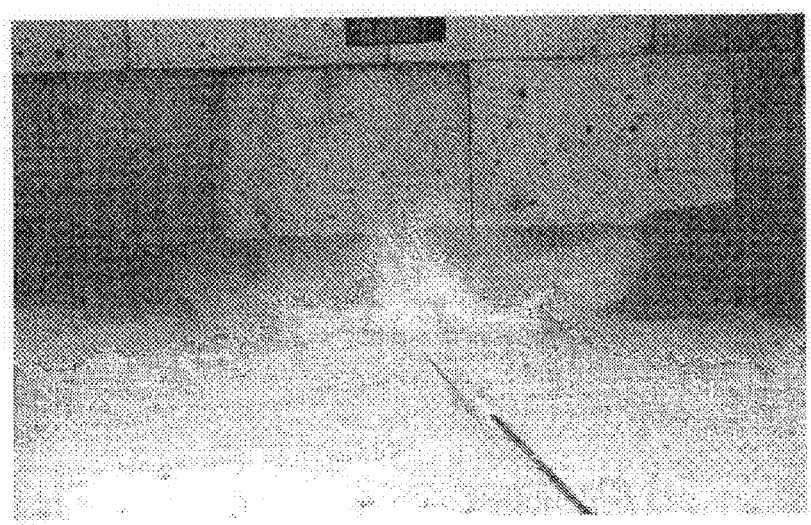
FIG. 4 represents a photograph taken during burner tests.

FIG. 4 precisely illustrates a case where the specific impulse of the burner is equal to 3 N/MW. In the photograph it is possible to distinguish the blanket and the tip of the burner located in the crown. The flame is only generated in the immediate vicinity of the blanket and spreads out over said blanket, transmitting the main part of its power by convection.

The invention claimed is:

1. A process for preparing glass from pulverulent batch materials in a furnace comprising sidewalls, a crown, an end wall and at least one air injector combined with at least one gaseous or liquid fuel injector, wherein said at least one air injector and at least one gaseous or liquid fuel injector are positioned in said crown said process comprising injecting air and gaseous or liquid fuel through said injectors to generate flames, whereby the liquid or gaseous fuel combusts with the air to generate a flame only in the immediate vicinity of the zone where said pulverulent batch materials cover the glass bath; wherein the injection of air and of gaseous or liquid fuel is carried out via a burner comprising at least one approximately cylindrical inner duct for the fuel and an outer duct for the air that is concentric to the inner duct; and wherein a specific impulse of the air injector combined with at least one of the gaseous or liquid fuel injector is between 2 and 4 N/MW.

2. The process as claimed in claim 1, wherein the furnace further comprises at least one overhead burner, of which an oxidizer is air, and at least one regenerator or recuperator.

3. The process as claimed in claim 1, wherein a gaseous fuel is injected at two different pressures via two concentric inner ducts.

4. The process as claimed in claim 1, wherein the fuel and air flows exiting the injectors are not laminar.

5. The process as claimed in claim 1, wherein the air used as an oxidizer is preheated to a temperature of at least 500° C. before entering the furnace.

6. The process as claimed in claim 1, wherein the air is introduced under substoichiometric conditions relative to the fuel in order to produce a glass whose redox is greater than 0.3.

7. The process as claimed in claim 1, wherein the chemical composition of the glass comprises more than 3% by weight of boron oxide and/or more than 12% by weight of alkali metal oxides.

8. The process as claimed in claim 1, wherein the glass produced contains less than 2% by weight of alkali metal oxides.

9. A process for preparing glass from pulverulent batch materials in a furnace comprising sidewalls, a crown, an end wall and at least one air injector combined with at least one gaseous or liquid fuel injector, wherein said at least one air injector and at least one gaseous or liquid fuel injector are positioned in said crown said process comprising injecting air and gaseous or liquid fuel through said injectors to generate flames, whereby the liquid or gaseous fuel combusts with the air to generate a flame only in the immediate vicinity of the zone where said pulverulent batch materials cover the glass bath, wherein the fuel and the air are injected separately from different places in the furnace.

10. The process as claimed in claim 9, wherein the furnace further comprises at least one overhead burner, of which an oxidizer is air, and at least one regenerator or recuperator.

11. The process as claimed in claim 9, wherein the fuel and air flows exiting the injectors are not laminar.

12. The process as claimed in claim 9, wherein the air used as an oxidizer is preheated to a temperature of at least 500° C. before entering the furnace.

13. The process as claimed in claim 9, wherein the air is introduced under substoichiometric conditions relative to the fuel in order to produce a glass whose redox is greater than 0.3.

14. The process as claimed in claim 9, wherein the chemical composition of the glass comprises more than 3% by weight of boron oxide and/or more than 12% by weight of alkali metal oxides.

15. The process as claimed in claim 9, wherein the glass produced contains less than 2% by weight of alkali metal oxides.

* * * * *